United States Patent
Raynal et al.

(10) Patent No.: US 8,950,785 B2
(45) Date of Patent: Feb. 10, 2015

(54) BROACH STYLE ANTI ROTATION DEVICE FOR CONNECTORS

(71) Applicant: Vetco Gray Inc., Houston, TX (US)

(72) Inventors: Jeffrey Allen Raynal, Houston, TX (US); Thomas Lowell Steen, Houston, TX (US); Nicholas Peter Gette, Houston, TX (US); David Lawrence Ford, Houston, TX (US); Benjamin Michael Snyder, Houston, TX (US); Stephen David Peters, Houston, TX (US); Ebony LaShaun Towns, Houston, TX (US); Roberto Jose Manzano, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 149 days.

(21) Appl. No.: 13/672,443

(22) Filed: Nov. 8, 2012

(65) Prior Publication Data

US 2014/0125053 A1 May 8, 2014

(51) Int. Cl.
*F16L 55/00* (2006.01)
*F16L 15/08* (2006.01)
*E21B 17/043* (2006.01)
*F16L 15/00* (2006.01)

(52) U.S. Cl.
CPC ............... *F16L 15/08* (2013.01); *E21B 17/043* (2013.01); *F16L 15/003* (2013.01)
USPC .................. 285/92; 285/91; 285/333; 29/456

(58) Field of Classification Search
USPC .................................. 285/91, 92, 333; 29/456
See application file for complete search history.

(56) References Cited

U.S. PATENT DOCUMENTS

| 2,400,318 | A | * | 5/1946 | Rosan ............................. 285/91 |
| 2,452,262 | A | * | 10/1948 | Rosan ............................. 285/92 |
| 3,259,161 | A | * | 7/1966 | Rosan ............................. 285/92 |
| 3,259,162 | A | * | 7/1966 | Rosan ............................. 285/92 |
| 3,259,163 | A | * | 7/1966 | Rosan et al. .................... 285/92 |
| 3,376,053 | A | * | 4/1968 | Novakovich et al. ........... 285/92 |
| 3,395,934 | A | * | 8/1968 | Rosan et al. .................... 285/92 |
| 3,404,415 | A | * | 10/1968 | Rosan et al. ..................... 470/2 |
| 3,472,538 | A | * | 10/1969 | Wilder et al. ................. 285/374 |
| 3,521,911 | A | * | 7/1970 | Hanes et al. .................... 285/91 |
| 3,624,812 | A | * | 11/1971 | Rosan et al. ............... 285/151.1 |
| 3,702,707 | A | * | 11/1972 | Rosan, Sr. ...................... 285/92 |
| 4,607,865 | A |   | 8/1986 | Hughes |
| 4,610,465 | A | * | 9/1986 | Boyadjieff ..................... 285/91 |
| 4,712,620 | A |   | 12/1987 | Lim |

(Continued)

FOREIGN PATENT DOCUMENTS

GB   2148439 A   5/1985
GB   2479818 A   10/2011

OTHER PUBLICATIONS

PCT Search Report and Written Opinion dated Feb. 7, 2014 from corresponding WO Application No. PCT/US2013/068274.

*Primary Examiner* — David E Bochna
(74) *Attorney, Agent, or Firm* — Bracewell & Giuliani LLP

(57) ABSTRACT

A broach style anti-rotation device for connected tubular members is described. In embodiments, the broach tool is inserted into a slot in an outer diameter surface of the pin, and teeth of the broach, which have a successively greater height when moving from the front to the tail of the broach, cut a slot in a surface of the box. Sidewalls of the broach and its teeth engage shoulders of each slot to prevent the rotation of the tubular members relative to each other.

20 Claims, 5 Drawing Sheets

(56) References Cited

U.S. PATENT DOCUMENTS

| | | | |
|---|---|---|---|
| 4,877,271 A * | 10/1989 | McCorkle et al. ............... 285/92 |
| 4,902,047 A * | 2/1990 | Marietta et al. ................. 285/92 |
| 4,903,992 A | 2/1990 | Jennings |
| 5,242,251 A | 9/1993 | Armstrong |
| 5,246,320 A | 9/1993 | Krippelz, Jr |
| 5,269,566 A * | 12/1993 | Do et al. ......................... 285/92 |
| 5,450,904 A | 9/1995 | Galle |
| 6,536,527 B2 | 3/2003 | Munk |
| 6,558,086 B1 | 5/2003 | Rigotti |
| 6,695,059 B2 | 2/2004 | Thomas et al. |
| 7,621,698 B2 | 11/2009 | Pallini, Jr. |
| 7,686,342 B2 | 3/2010 | Jennings |
| 7,896,081 B2 | 3/2011 | Pallini |
| 8,070,396 B2 | 12/2011 | Koskinen |
| 8,127,853 B2 | 3/2012 | Pallini |
| 8,333,243 B2 | 12/2012 | Pallini, Jr. |
| 8,690,200 B1 * | 4/2014 | Patterson, Jr. ................... 285/92 |
| 2011/0260445 A1 * | 10/2011 | Watterson et al. .............. 285/91 |
| 2014/0103640 A1 * | 4/2014 | O'Dell et al. ................... 285/91 |

* cited by examiner

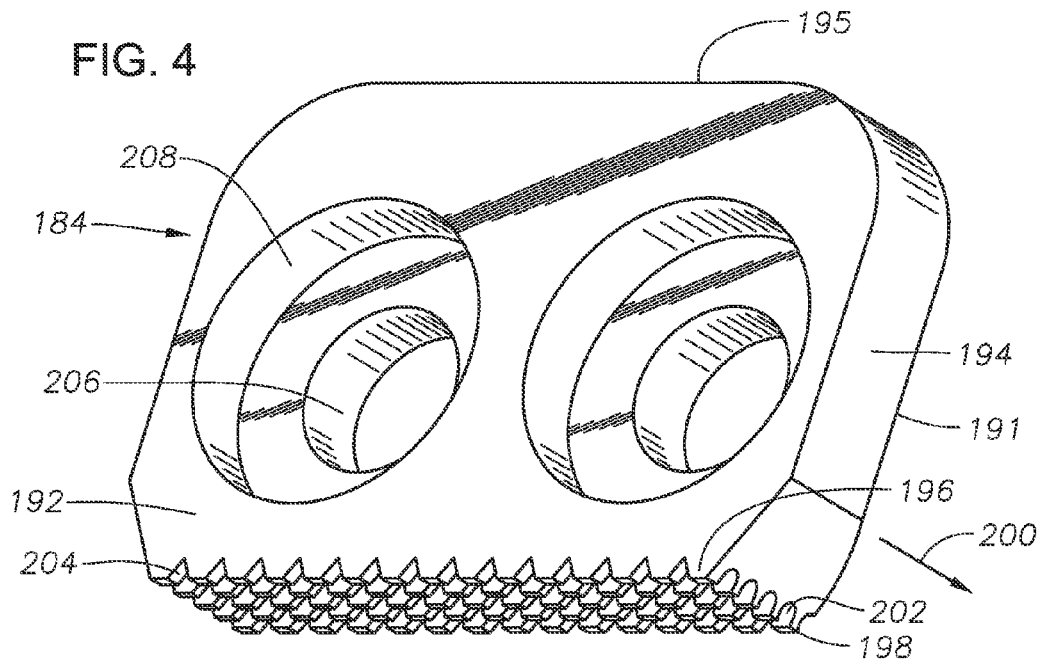
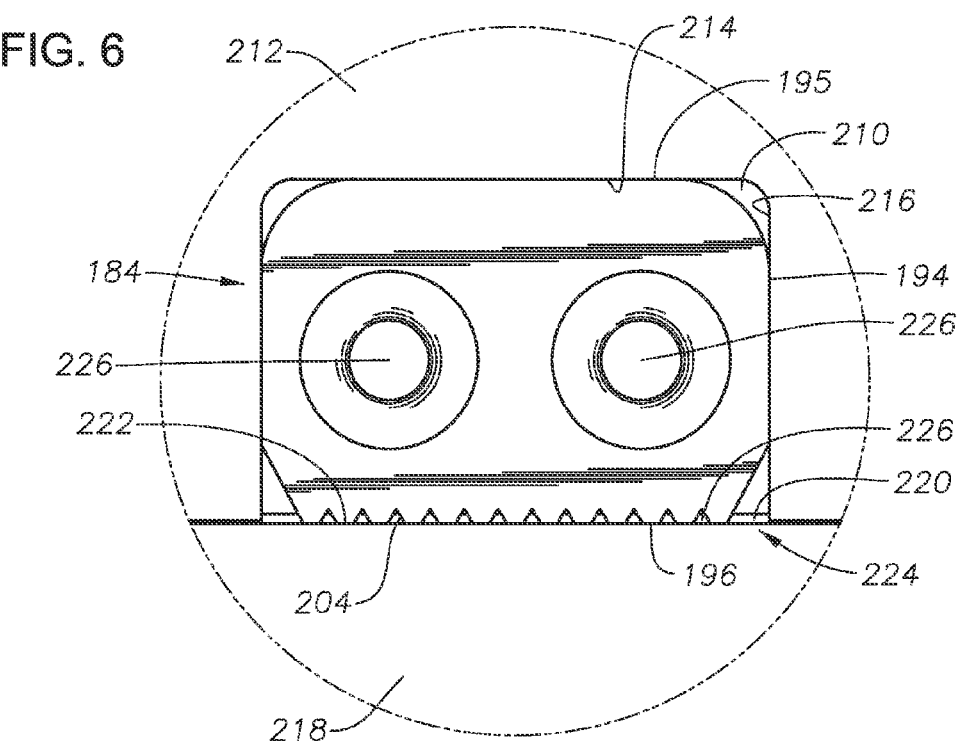

BROACH STYLE ANTI ROTATION DEVICE FOR CONNECTORS

BACKGROUND OF THE INVENTION

1. Field of the Invention

The present invention relates in general to tubular connectors, and in particular to an anti-rotation device to prevent two connected tubular members from rotating relative to each other.

2. Brief Description of Related Art

Tubular members are connected to each other for various wellbore operations. The tubular members can be, for example, pipe, drill string, riser sections, and casing, and the like. Some of the joints between tubular members involve a pin and box connector, wherein external threads on the pin threadingly engage internal threads on the box. Once the pin and box are made up to the desired torque, a locking mechanism is used to prevent them from rotating relative to each other.

Operators have employed anti-rotation keys or tabs to prevent loosening. In a key style anti-rotation device, a key is inserted into the annulus between the pin and the rim of the box. Such insertion, however, can cause a "hoop style" deformation of the box, wherein the portion of the box near the key is forced outward, resulting in a non-round, or oval shape. Such deformation puts stress on the box. In a tab-style anti-rotation device, a rectangular pocket or slot is machined on the outer surface of the pin connector. The box connector is machined to include tabs that can be driven into the pocket. The box connector tab and pin connector pocket will line up after making up the connectors. The workers will then drive the tab into the pin connector pocket. Unfortunately, for some types of anti-rotation tabs, the most expedient way to engage the tab is to use a tool gun with an explosive cartridge, the explosive cartridge actuating a hammer to push the tab in. The explosive tool gun, however, can be perceived as hazardous to use and, in some cases, is not allowed by local laws. It is desirable to have an anti-rotation device that does not require the use of an explosive hammer to prevent the rotation of made-up tubular members relative to each other.

SUMMARY OF THE INVENTION

Embodiments of the claimed invention include a broach style anti-rotation tool for use with tubular members that are connected, or made-up, to each other to prevent the rotation of one member relative to the other member. The tubular connectors can be sections of, for example, riser casing, drill string, pipe, or any other type of tubular that includes a pin and box type connection that is connected by way of rotation.

The broach style anti-rotation device is inserted in a slot on the box or pin, between the connector box and the pin. The device acts as a broach tool by removing material in steps and serrating into the opposite member. For example, if the slot is on the pin, then the broach tool removes material from the box. When the broach teeth dig into that opposite member, the broach disallows rotation between the two members.

Pin and box members are typically made-up to an operation torque. In one type of conventional connectors, the box has a tab and the pin has a slot. The slot indicates the location of a feature on the pin, such as a recess for receiving a tab, and thus indicates when the connector is properly made-up. That slot, used on conventional pin connectors, can be used in conjunction with the broach-style anti-rotation tool.

Once the connectors are completely installed, the broach style anti-rotation tool is inserted and driven into the pin slot by a hydraulic or pneumatic tool. Other types of impact or press-fit tools can be used. In order to easily shear material from the inner wall of the box near the rim, the key will have the broach teeth at the front to cut the box material as it is being inserted. As the device is inserted, it digs into the box connector by removing material within each step until it reaches the desired dimension. The device is fully inserted when the lower shoulder rests flush against the top of the box connector. At this point, the device is secured and will provide anti-rotation resistance to keep the connector from breaking torque. By shearing material as it is inserted, the broach style tool does not cause the hoop expansion associated with other types of keys. The shearing nature of the broach style tool also decreases the amount of insertion force required and provides more surface area of engagement between the device and the box.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 4 is a perspective view of an embodiment of an anti-rotation broach for radial insertion.

FIG. 6 is a side view of the anti-rotation broach of FIG. 4 shown in engagement with a pin and a box.

DETAILED DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
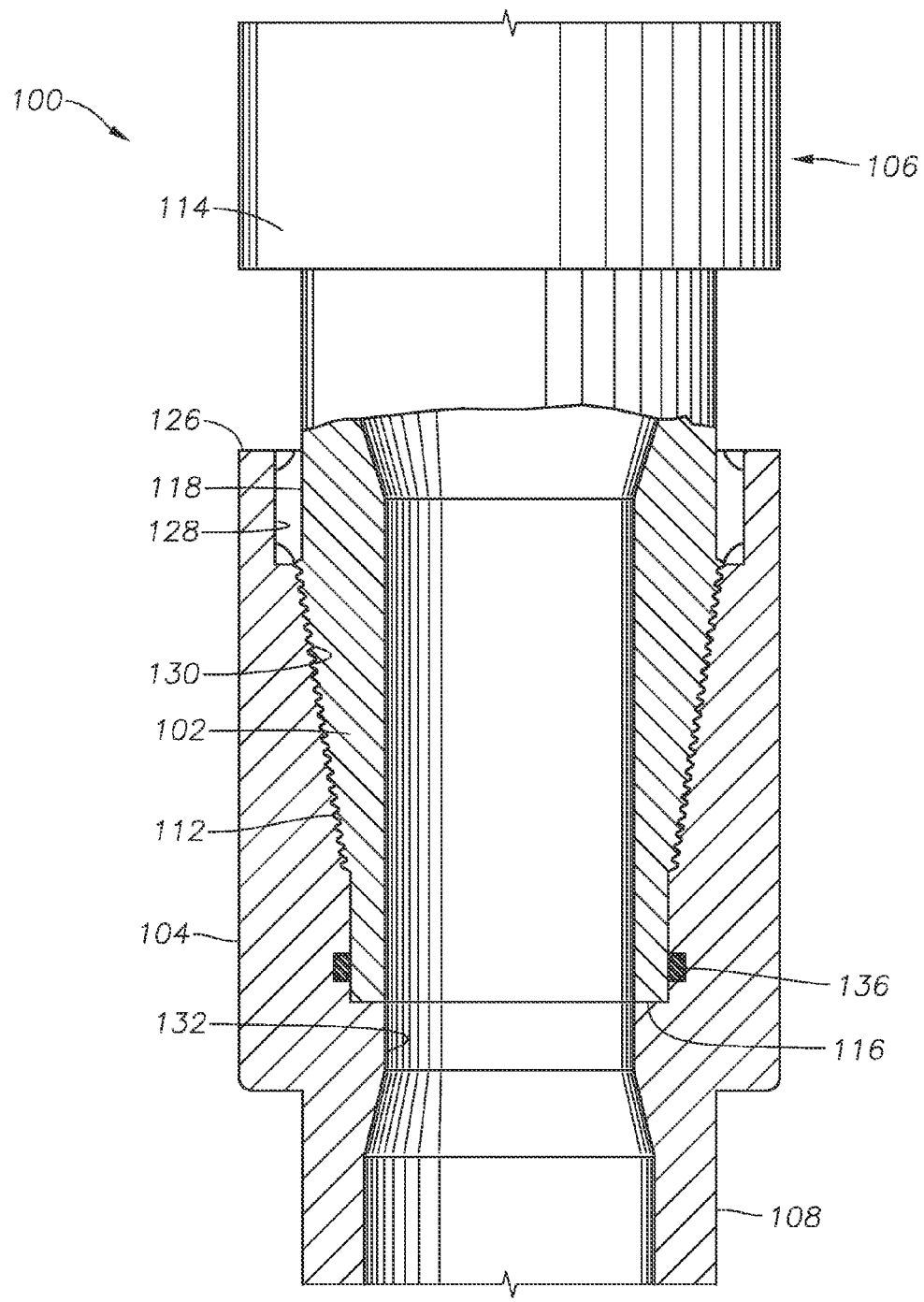
FIG. 1 is a side sectional view of a box and pin connection between two tubular members.

Referring to FIG. 1, anti-rotation mechanism 100 for a tubular connection or pipe joint between a pin member ("pin") 102 and box member ("box") 104 is shown. Pin 102 is a connector on tubular member 106, and box 104 is a connector on tubular member 108. Tubular members 106 and 108 can be any type of tubular member including, for example, pipe, riser sections, drill string sections, and casing. Tubular members 106 and 108 can each have connectors at each end such as pin 102 at one end and box 104 at the other end.

Figure 2:
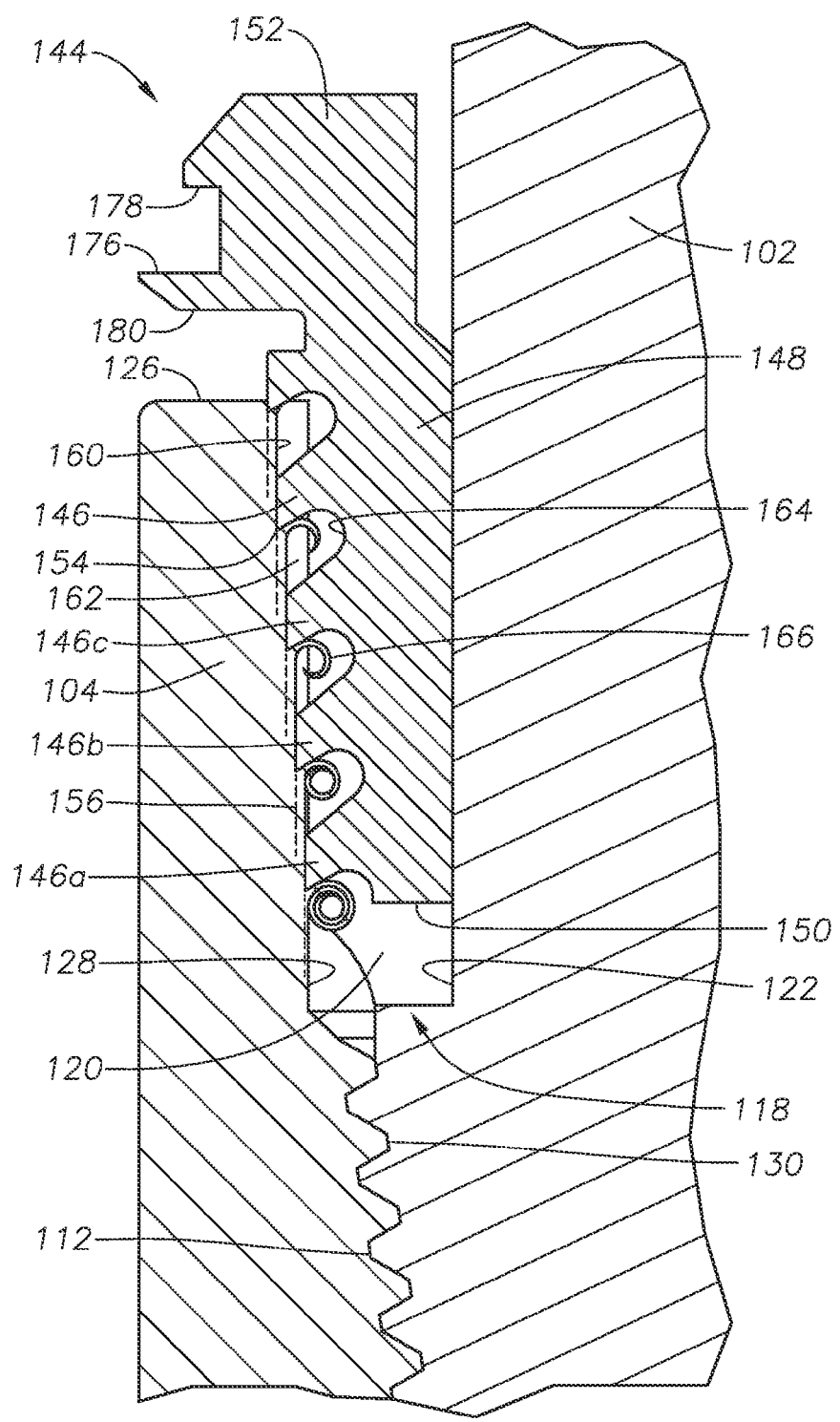
FIG. 2 is a side sectional view of an anti-rotation broach engaging each of a box and a pin in accordance with an embodiment of the invention.

Pin 102 has an external thread 112 that extends downward from pin cylindrical body 114 toward a pin end 116. One or more axial slots 118 are formed on an outer diameter surface of cylindrical body 114. Referring to FIG. 2, each axial slot 118 is generally parallel to the axis of pin 102. Axial slot 118 includes slot sidewalls 120, and a slot backwall 122. The axial length of slot 118 extends from a lowermost point just above threaded section 112 upward to a point that will be accessible when pin 102 is made up with box 104. The broach style anti-rotation device is not limited to connectors having a slot in the pin. For example, the slot can be in the box.

Box 104 has a rim, or box end, 126. A bore 128 having a cylindrical inner diameter surface extends downward from rim 126. Box 104 has an internal thread 130 that is cooperative with external thread 112, extending from a rim 126 to a box bore 132. The inner diameter of bore 128 can range from slightly greater than the outer diameter of body 114 so that there is a close fit between the two components, or the diameter of bore 104 can be greater than the outer diameter of body 114 such that an annulus exists between the two components.

Pin 102 and box 104 are rotated relative to each other to make up threads 112 and 130 into a joint as shown in FIG. 1. For description purposes, it is assumed that pin 102 is pointing downward such that pin end 116 is the lowermost portion of pin 102, and box 104 is pointing upward such that box end 126 is the uppermost portion of box 104. The relative positions described in this specification, such as "above" or "below" are for description only. The components described can be used in any orientation.

As one of skill in the art will appreciate, seal 136 can reside in a groove at a lower end of box 104 for sealing against the nose section of pin 102. Other sealing techniques, such as metal-to-metal sealing, can be used to establish a seal between pin 102 and box 104. One or more conventional anti-rotation tabs (not shown) can be spaced apart around a circumference of the outer diameter of box 104. The tabs (not shown) can be driven into circumferentially extending recesses (not shown) of pin 102. Slots 118 can be conventional locator slots that indicate the location of the recesses (not shown) in pin 102. Alternatively, anti-rotation mechanism 100, and thus slots 118, can be used in embodiments that do not include tabs and recesses.

Referring to FIG. 2, broach 144 is a cutting tool having multiple teeth 146 protruding from a face of body 148. The width of body 148 is less than the distance between sidewalls 120 of slot 118, so that body 148 can slide into slot 118. Teeth 146, and possibly a portion of body 148 protrude radially from slot 118 when broach 144 is positioned in slot 118.

The height of teeth 146 gets progressively greater when moving from the nose 150 to the tail 152 of broach 144. As shown in FIG. 2, the height of tooth 146a is less than the height of tooth 146b, the height of tooth 146b is less than the height of tooth 146c, and so on (The designations of "a," "b," and "c" are to distinguish which tooth 146 is providing a cut at a specific depth. Each of teeth 146a, 146b, and 146c are considered a tooth 146). At least a plurality of teeth 146 have a height selected so that those teeth engage the inner diameter surface of bore 104 when broach 144 is positioned in slot 118 and the bottom surface of broach 144 is in contact with backwall 122.

Each tooth 146 includes a cutting surface 154. Cutting surface 154 is located at the tip of each tooth 146 and is generally transverse to the length of body 148. Cutting surface 154 faces toward nose 150 so that when broach 144 is driven into slot 118 and teeth 146 engage bore 104, cutting surfaces 154 shear away a portion of the surface of bore 104. Because the length of body 148 can be greater than or less than the width of body 148, the longitudinal direction of broach 148 is defined by the direction of the cutting surfaces 154 of each tooth 146.

As shown in FIG. 2, each tooth 146 shears away a portion of the surface of bore 104 to create rim slot 160. Dashed lines 156 represent the depth of cut of each successive tooth 146. Because the height of each successive tooth 146 is greater than the previous tooth 146, each successive tooth 146 shears an amount of material equal to the height differential between it and the preceding tooth 146. Therefore, tooth 146a shears a shallow groove that defines the entire length of rim slot 160. Tooth 146b, which follows tooth 146a, makes the shallow groove deeper by an amount equal to the height differential between tooth 146b and tooth 146a. Tooth 146b does not travel the entire length of the newly cut rim slot 160, thus giving rim slot 160 a stepped profile. Tooth 146c, which follows tooth 146b, makes the groove deeper by an amount equal to the height differential between tooth 146c and tooth 146b. After rim slot 160 is cut into the bore 128 of box 104, a shoulder 162 of rim slot 160 engages the side faces of teeth 146. Embodiments of broach 144 include gullet 164 located between each tooth 146. Gullet 164 is a recess that receives and holds the material, or chips 166, sheared away by each tooth 146.

Figure 3:
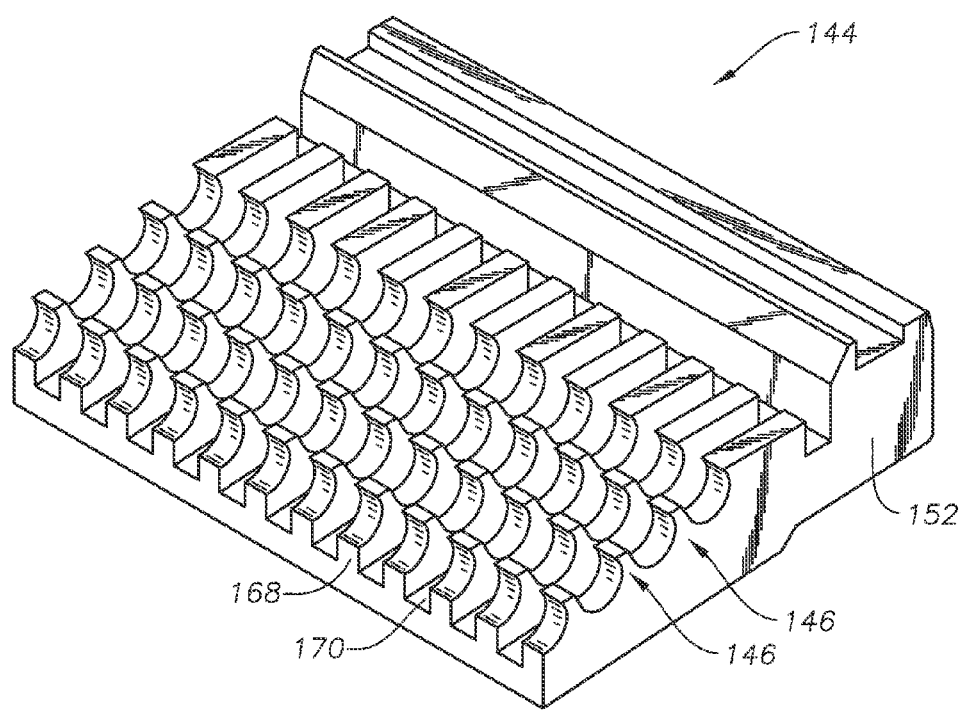
FIG. 3 is a perspective view of the anti-rotation broach of FIG. 2.

Referring to FIG. 3, each tooth 146 can have multiple laterally adjacent tooth segments 168, separated by linear slot 170. The laterally adjacent segments 168 cut in the same horizontal plane, wherein that plane is transverse to body 148 and, thus, transverse to the direction in which broach 144 is advancing during the cut. The tooth segments 168 of each successive tooth 146 are linearly aligned so that the teeth 146 successively remove material from a plurality of slots, thus leaving on bore 104 a plurality of shoulders 162 (FIG. 2) between each series of tooth segments 168.

Referring back to FIG. 2, tail 152 has a height greater than the height of any of the teeth 146. When broach 144 is inserted between pin 102 and box 104, tail 152 protrudes above rim 126 and, thus, can be used as a contact point for driving broach 144 into position. Upward facing shoulder 176 can also be used to insert broach 144. Similarly, broach 144 includes a downward facing shoulder 178 that can be used to extract broach 144. The broach is fully inserted when the lower shoulder 180 of tail 152 contacts rim 126.

In operation, tubular member 106 is made up with tubular member 108 by inserting pin 102 into box 104. Pin 102 is rotated, relative to box 104, so that external thread 112 threadingly engages internal thread 130. Pin 102 is rotated until a desired torque is achieved. The desired torque is determined based on, for example, the torque necessary to achieve a particular seal between the two members.

Once pin 102 is sufficiently torqued into box 104, broach 144 is inserted between pin body 114 and bore 128 of rim 126. In embodiments having a slot 118 on pin 102, slot 118 or a portion thereof is concentrically located with rim 126, and body 148 of broach 144 is inserted into slot 118. Slot 118 is parallel to the axis of pin 102 and, thus, broach 144 is axially inserted along the outer diameter of the sidewall of pin body 114. Teeth 146 are facing downward with cutting surface 154 transverse to the axis of pin 102 and box 104 when broach 144 is inserted. Teeth 146 of broach 144 begin to engage the inner diameter surface of bore 128 as broach 144 is inserted.

A tool is used to force broach 144 into position. The tool can be a pneumatic or hydraulic hammer, a hydraulic press, a manual hammer, or any other type of device that can exert axial force against tail 152 of broach 144. Because teeth 146 extend radially beyond the inner diameter of bore 128, cutting surface 154 begins to shear away material from box 104. Each successive tooth 146 is a step taller than the preceding tooth 146, so each tooth 146 cuts a new step into bore 128. None of the teeth 146 individually cut the full depth of rim slot 160. Rather, each tooth 146 cuts an additional portion beyond what the lower tooth 146 cut. Broach 144 is fully inserted when the lower shoulder 180 rests flush against the top of the box connector rim 126. Because broach 144 shears material from box 104, it does not exert outward radial force against box 104. Therefore, there is an absence of radial deformation when broach 144 is inserted.

With broach 144 fully inserted, slot sidewalls 120 transfer torque to body 148 of broach 144. Broach 144, in turn, transfers torque to shoulders 162 of rim slot 160 by way of the side of each tooth 146. Broach 144, thus, prevents pin 102 from rotating relative to box 104.

Referring to FIG. 4, broach 184 includes a body 190, defined by front face 191, rear face 192, sidewalls 194, and top surface 195. Teeth 196 extend downward from body 190, on the end opposite of top surface 195. Cutting surfaces 198 are located at the tips of teeth 196. Cutting surfaces 198 are generally parallel to front face 191 and rear face 192, and face the opposite direction of rear face 192. The direction of insertion of broach 184 is toward front face 191. Arrow 200 indicates the direction of insertion of broach 184. Cutting surfaces 198, thus, shear material when broach 184 is moved in the direction of insertion.

Teeth 196 make up a plurality of rows of teeth 196. When moving from the rear of broach 184 toward rear face 192, each tooth 196 has a successively greater height. Therefore, when the broach is advanced in the direction of insertion (arrow 200), the first tooth 196 to engage shears away a small amount of material, the following tooth 196 shears an additional amount of material from the same slot sheared by the first tooth 196, and so on. Gullets 202 are located between teeth 196 in the direction of insertion. Linear slots 204 are located between tooth segments along the width of broach 184. One or more bores 206 pass through front rear 192 of body 190. Bores 206, thus, are parallel to the direction of insertion. Each bore 206 can have a counterbore 208.

Figure 5:
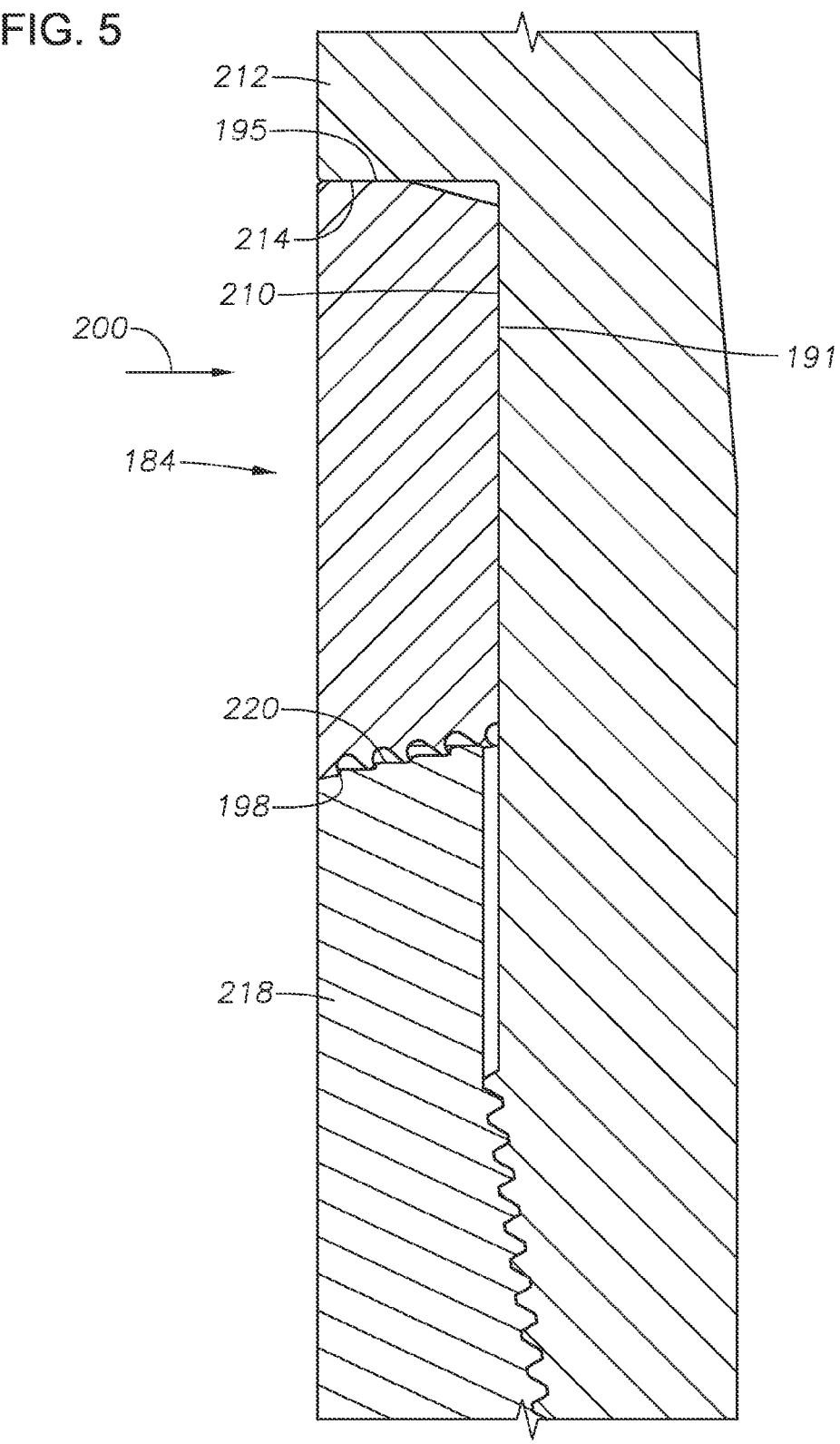
FIG. 5 is a partial sectional side environmental view of the anti-rotation broach of FIG. 4 shown in engagement with a pin and a box.

Referring to FIG. 5, slot 210 is a recess on an outer diameter of pin 212. Slot 210 is defined by a downward facing shoulder 214, and sidewalls 216 (FIG. 6). Slot 210 is a three-sided slot, having an open lower end. Box 218, which threadingly engages pin 212, has a rim with an upward facing surface 220. When box 218 is operationally connected to pin 212, upward facing surface 220 defines the lower edge of slot 210. The vertical height of broach 184, from top surface 195 to cutting surfaces 198 (at the tips of teeth 196), is greater than the vertical height of slot 210 from downward facing shoulder 214 to upward facing surface 220.

Radial broach 184 is inserted radially, rather than axially, into slot 210. The direction of insertion 200 is normal to the outer diameters of pin 212 and box 218, with front face 191 facing the back wall of slot 210. Radial broach is forcibly inserted into slot 210, thus causing cutting surfaces 198 to shear a portion of upward facing surface 220. The sheared portion of upward facing surface 220 defines rim slot 222. Broach 184 is forcibly inserted by, for example, striking it one or more times with a hammer, a pneumatic hammer, urging it inward with a hydraulic press, or any other device for applying radial force. After rim slot 222 is cut into surface 220, a shoulder 224 of rim slot 222 engages the side faces of teeth 196. Linear slots 204, between segments of each tooth 196, do not cut material from surface 220, thus leaving ridges 226 which engage shoulders of each segment of tooth 196.

Referring to FIG. 6, once radial broach 184 is fully inserted, fasteners such as bolts 226 are used to hold broach 184 in position. Threaded bolt holes (not shown) are located in the back wall of slot 210 in alignment with bores 206. Bolts 226 pass through bores 206 and threadingly engage the bolt holes (not shown). With broach 184 fully inserted, slot sidewalls 216 transfer torque to body 190 of broach 184. Broach 184, in turn, transfers torque to shoulders 224 of rim slot 222 by way of the side of each tooth 196. Broach 184, thus, prevents pin 212 from rotating relative to box 218.

While the invention has been shown or described in only some of its forms, it should be apparent to those skilled in the art that it is not so limited, but is susceptible to various changes without departing from the scope of the invention.

What is claimed is:

1. A tubular connection comprising:
    a tubular box connector having a rim, a cylindrical inner diameter surface extending from the rim, and an internal threaded section extending from the inner diameter cylindrical surface;
    a tubular pin having an external threaded section extending from a cylindrical body having an outer diameter surface, the cylindrical outer diameter surface being positioned concentrically within the cylindrical inner diameter surface when the external threaded section mates with the internal threaded section;
    a slot in at least one of the inner diameter surface and the outer diameter surface, the slot having a pair of sidewalls; and
    a broach, the broach having a tool body with a plurality of teeth extending from a face of the tool body and having a cutting direction, each of the plurality of teeth protruding further from the outward face than the preceding one of the plurality of teeth, when moving opposite the cutting direction, so that when the broach is driven into the slot, the teeth protrude from the slot and remove a material from and shearingly engage, one of the box member and the pin member to create a sheared slot, the pair of sidewalls engaging the body to prevent rotational movement of the pin member relative to the box member.

2. The tubular connection according to claim 1, wherein each of the plurality of teeth further comprises at least two cutting surfaces separated by a linear slot, the linear slots of each of the plurality of teeth being aligned with the linear slot of each of the other of the plurality of teeth.

3. The tubular connection according to claim 1, wherein each tooth comprises a cutting surface, the cutting surface being generally transverse to an axis of the box member when the broach is driven into the slot.

4. The tubular connection according to claim 1, wherein the sheared slot is on an inner diameter surface of the rim.

5. The tubular connection according to claim 1, wherein the sheared slot is on an end of the rim.

6. The tubular connection according to claim 1, wherein the broach further comprises a gullet located axially between each of the teeth and wherein at least a portion of the material sheared away by each of the teeth is contained by the gullet.

7. The tubular connection according to claim 1, wherein the slot is an axial slot parallel to an axis of the pin.

8. An anti-rotation system for a connection joint, the system comprising:
    a pin member comprising:
        a pin thread section having a plurality of outward facing threads extending from an end of the pin member,
        a cylindrical outer diameter surface extending from the pin thread section, and a slot in the cylindrical outer diameter surface proximate to the pin thread section;

a box member comprising:
a cylindrical rim having a rim surface,
a box thread section having a plurality of inward facing threads on an inner diameter surface, the box thread section threadingly engaging the pin thread section to detachably connect the pin member to the box member; and a broach comprising:
a body having a first and second end in a common plane, and defining a direction of insertion perpendicular to the common plane, and
a plurality of teeth extending from the second end, each of the plurality of teeth terminating in a cutting surface, the length of the body from the first end to at least one of the plurality of teeth being greater than the distance from a surface of the slot to the rim surface, so that when the broach is inserted into the slot, with the teeth facing toward the rim, at least one of the plurality of teeth shears a rim slot in, and removes a material from, the rim.

9. The anti-rotation system according to claim 8, wherein the rim surface is on an inner diameter of the rim.

10. The anti-rotation system according to claim 8, wherein the rim surface is on an end of the rim.

11. The anti-rotation system according to claim 8, wherein the height of each of the plurality of teeth is greater than the height of the preceding one of the plurality of teeth when moving in the direction of insertion, so that the first of the plurality of teeth that engages the rim cuts the rim slot and each successive tooth increases the depth of the rim slot.

12. The anti-rotation system according to claim 8, wherein each of the plurality of teeth further comprises at least two cutting surfaces separated by a linear slot, the linear slots each being aligned with the linear slots of each of the other of the plurality of teeth.

13. The anti-rotation system according to claim 8, wherein a plurality of the plurality of teeth shears away a portion of the rim to create the rim slot when the broach is driven into the slot.

14. The anti-rotation system according to claim 8, wherein the broach further comprises a gullet located between each of the plurality of teeth and wherein at least a portion of the material sheared away by each of the teeth is contained by the gullet.

15. A method for preventing rotation between connected tubular members, the method comprising:

a. providing a box member comprising a rim having a rim surface and a plurality of inward facing threads,
b. inserting a pin member into the box member, the pin member comprising a pin thread section having a plurality of outward facing threads extending from an end of the pin member, a cylindrical outer diameter surface extending from the pin thread section, and a slot in the cylindrical outer diameter surface proximate to the pin thread section;
c. threadingly engaging the inward facing threads with a pin thread section of a box member until a seal is formed between the pin member and the box member, the rim being concentrically located with a portion of the cylindrical outer diameter surface;
d. positioning a broach proximate to the slot, the broach comprising a body having a first and second end, and a plurality of teeth extending from the second end, the length from the first end to the teeth being greater than a dimension of the slot so that the teeth protrude from the slot when the broach is inserted into the slot; and
e. shearing a rim slot in the rim and removing a material from the rim by driving the broach into the slot.

16. The method according to claim 15, wherein each successive one of the plurality of teeth has a height greater than the preceding one of the plurality of teeth, when moving from the first end to the second end, and wherein step (e) further comprises each one of the plurality of teeth cutting the rim slot successively deeper.

17. The method according to claim 15, further comprising the step of resisting rotation of the pin member relative to the box member by engaging a shoulder of the slot and a shoulder of the rim slot with the broach.

18. The method according to claim 15, wherein each of the plurality of teeth further comprises at least two cutting surfaces separated by a linear slot, the linear slots each being aligned with the linear slots of each of the other of the plurality of teeth, and wherein step (e) further comprises shearing at least two parallel rim slots.

19. The method according to claim 18, wherein a sidewall of each of the rim slots engages a tooth sidewall of at least one of the plurality of teeth to prevent the box member from rotating relative to the pin member.

20. The method according to claim 18, further comprising the step of securing the broach with at least one threaded fastener.

* * * * *